United States Patent
Gao et al.

(10) Patent No.: US 11,768,592 B1
(45) Date of Patent: Sep. 26, 2023

(54) METHOD AND APPARATUS FOR RESIZING WINDOW, ELECTRONIC DEVICE, AND READABLE STORAGE MEDIUM

(71) Applicant: BEIJING XIAOMI MOBILE SOFTWARE CO., LTD., Beijing (CN)

(72) Inventors: Yuan Gao, Beijing (CN); Wenbai Zheng, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/899,584

(22) Filed: Aug. 30, 2022

(30) Foreign Application Priority Data

Apr. 12, 2022 (CN) .......................... 202210383912.6

(51) Int. Cl.
*G06F 3/04845* (2022.01)
*G06F 1/16* (2006.01)

(52) U.S. Cl.
CPC ........ *G06F 3/04845* (2013.01); *G06F 1/1652* (2013.01)

(58) Field of Classification Search
CPC ... G06F 3/04845; G06F 3/0484; G06F 1/1652
USPC ........................................................ 715/764
See application file for complete search history.

(56) References Cited

U.S. PATENT DOCUMENTS

| | | | | |
|---|---|---|---|---|
| 2014/0098028 | A1* | 4/2014 | Kwak | G06F 1/1652 345/173 |
| 2015/0186016 | A1* | 7/2015 | Li | G06F 3/04847 715/765 |
| 2016/0034156 | A1* | 2/2016 | Vranjes | G06F 3/04842 715/800 |
| 2016/0217551 | A1* | 7/2016 | Kim | G09G 5/005 |
| 2016/0307545 | A1* | 10/2016 | Lee | G09G 5/346 |
| 2016/0373654 | A1* | 12/2016 | Kwon | G09G 5/373 |
| 2017/0011714 | A1* | 1/2017 | Eim | G06F 1/1677 |
| 2017/0147189 | A1* | 5/2017 | Ryu | G06F 3/04886 |
| 2019/0235578 | A1* | 8/2019 | Zhang | G06F 3/0484 |
| 2021/0337049 | A1* | 10/2021 | Noh | H04M 1/0237 |
| 2021/0405857 | A1* | 12/2021 | Kim | G06F 3/0482 |
| 2022/0397939 | A1* | 12/2022 | Cha | G06F 3/0488 |
| 2023/0017891 | A1* | 1/2023 | Kim | H04M 1/72448 |
| 2023/0040472 | A1* | 2/2023 | Kim | H04N 21/236 |

FOREIGN PATENT DOCUMENTS

| | | | | | |
|---|---|---|---|---|---|
| CN | 112269555 A | * | 1/2021 | .......... | G06F 3/1423 |
| CN | 113206915 A | * | 8/2021 | .......... | G06F 3/0484 |
| WO | WO-2021232960 A1 | * | 11/2021 | | |

* cited by examiner

*Primary Examiner* — Reza Nabi
*Assistant Examiner* — Hwei-Min Lu
(74) *Attorney, Agent, or Firm* — Arch & Lake LLP

(57) ABSTRACT

The present disclosure relates to a method for resizing a window, an electronic device, and a readable storage medium. The method includes: obtaining, in response to an operation triggered for rotating a roll-up shaft being detected, a stretching rate and duration of the roll-up screen; and resizing the window of a current application displayed by the roll-up screen based on the stretching rate and duration of the roll-up screen.

9 Claims, 6 Drawing Sheets

METHOD AND APPARATUS FOR RESIZING WINDOW, ELECTRONIC DEVICE, AND READABLE STORAGE MEDIUM

CROSS REFERENCE TO RELATED APPLICATION

This application is based upon and claims priority to Chinese Patent Application No. 202210383912.6, filed on Apr. 12, 2022, the entire content of which is incorporated herein by reference for all purposes.

TECHNICAL FIELD

The present disclosure relates to the field of image processing technology, and in particular, to a method and apparatus for resizing a window, an electronic device, and a readable storage medium.

BACKGROUND

With the increasing size of electronic device displays, more and more electronic devices are using roll-up screens to reduce the size of electronic devices. In practice, in the process of using roll-up screens, users may open multiple applications in electronic devices, and the window sizes of different applications are different. When switching windows, it may switch directly from a large window or small window to the target window and the jitter of switching between windows of different sizes may cause discomfort to the users, reducing the use experience.

SUMMARY

The present disclosure provides a method and apparatus for resizing a window, an electronic device, and a readable storage medium to address the deficiencies of the related art.

According to a first aspect of the present disclosure, there is provided a method for resizing a window, applied to an electronic device provided with a roll-up screen. The method includes: obtaining, in response to an operation triggered for rotating a roll-up shaft being detected, a stretching rate and duration of the roll-up screen; and resizing the window of a current application displayed by the roll-up screen based on the stretching rate and duration of the roll-up screen.

According to a second aspect of the present disclosure, there is provided an electronic device. The electronic device includes a memory and a processor. The memory is configured to store a computer program executable for the processor; and the processor is configured to execute the computer program in the memory to implement the method as described above.

According to a third aspect of the present disclosure, there is provided a non-transitory computer-readable storage medium that, when an executable program in the storage medium is executed by a processor, can implement the method as described above.

It should be understood that the foregoing general description and the following detailed description are only exemplary and explanatory and do not limit the present disclosure.

BRIEF DESCRIPTION OF THE DRAWINGS

The accompanying drawings, which are incorporated in and constitute a part of this description, illustrate embodiments consistent with the present disclosure, and are used to explain the principles of the disclosure in conjunction with the description.

DETAILED DESCRIPTION

Figure 1:
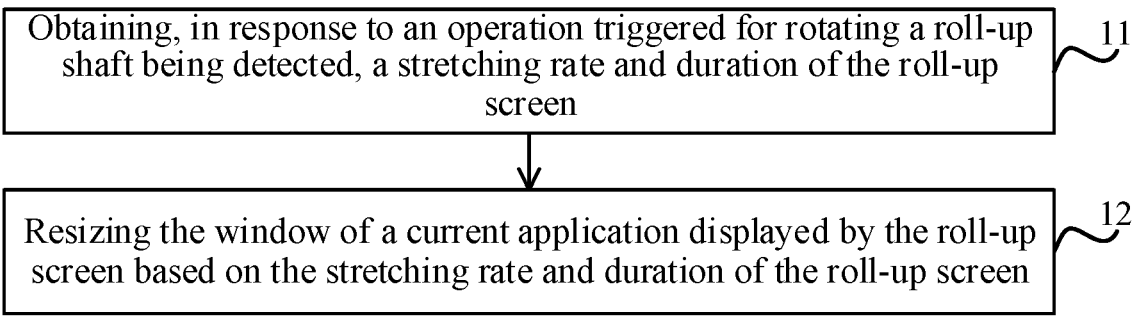
FIG. 1 is a flow chart of a method for resizing a window illustrated in accordance with an example of the present disclosure.

Exemplary embodiments will be described here in detail, examples of which are illustrated in the accompanying drawings. When the following description relates to the drawings, the same numerals in different drawings refer to the same or similar elements unless otherwise indicated. The implementations described in the examples below are not intended to represent all implementations consistent with this disclosure. Rather, they are only examples of devices and methods consistent with some aspects of the present disclosure as recited in the appended claims. It should be noted that the features in the following examples and implementations can be combined with each other without conflict.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

With the increasing size of electronic device displays, more and more electronic devices are using roll-up screens to reduce the size of electronic devices. In practice, in the process of using roll-up screens, users may open multiple applications in electronic devices, and different applications have different window sizes. When switching windows, it may switch directly from a large window or small window to the target window and the jitter of switching between windows of different sizes may cause discomfort to the users, reducing the use experience.

Examples of the present disclosure provide a method for resizing a window that can be applied to an electronic device including a roll-up screen. FIG. 1 is a flow chart of a method for resizing a window illustrated in accordance with an example. Referring to FIG. 1, the method for resizing the window includes steps 11-12.

In step 11, a stretching rate and duration of the roll-up screen are obtained in response to an operation triggered for rotating a roll-up shaft being detected.

In this example, the electronic device is provided with a roll-up screen. The roll-up screen is flexible and it can be fixed to the roll-up shaft. The electronic device is further provided with a control button, which can start or stop a drive member. When the control button is pressed or pressed for more than a set period of time (e.g. 1 s), the above-mentioned drive member starts to work and drives the roll-up shaft for rotation. During the rotation of the roll-up shaft, the roll-up shaft can drive the roll-up screen to rotate and wind the roll-up screen onto the roll-up shaft, so that the roll-up screen expands or contracts. In addition, the display area size of the roll-up screen becomes larger (when the roll-up screen is extended) or smaller (when the roll-up screen is contracted). It should be understood that the maximum size and minimum size of the roll-up screen are known, where the maximum size is the size of the roll-up screen when fully extended and the minimum size is the size of the roll-up screen when fully contracted.

In the process of using the electronic device, the user may open multiple applications among the installed applications in the electronic device, such as video applications, news applications, notepad, instant messaging applications, etc., i.e., the roll-up screen of the electronic device displays at least one application window. The window sizes of different applications may be different, and thus, the size of the above application windows during the rotation of the roll-up shaft may exceed the extended area of the roll-up screen or occupy a part of the display area, making the size of the application window mismatch with the size of the display area of the roll-up screen and reducing the use experience.

In some examples, the operation that is triggered for rotating the roll-up screen may be an operation in which a control button is triggered to control the rotation of the roll-up screen. The processor in the electronic device may detect whether the control button is triggered. For example, when the control button is triggered (pressed or long pressed), its corresponding process will be triggered; or, when the control button is triggered, the above triggering event will be detected by WindowManagerService in the operating system. When the control button is detected to be triggered, the processor may obtain the duration of the roll-up screen in response to the operation for rotating the roll-up shaft being detected. The duration may be the duration of pressing the control button, or the preset duration corresponding to the control button being pressed once (e.g. 3-5 s), which can be set according to the specific scenario and is not limited here.

In some examples, the operation that is triggered for rotating the roll-up shaft may be a shortcut gesture by the user (e.g., a touch operation for the display). A number of shortcut gestures are stored in the electronic device, and these shortcut gestures may be system defaults or may be set by the user depending on the actual situation. The operation for rotating the roll-up shaft is triggered when the processor detects a user gesture that is consistent with the shortcut gesture preset by the electronic device for controlling the rotation of the roll-up shaft.

In this example, the stretching rate of the roll-up screen is obtained by the processor of the electronic device.

Taking into account that the driving member for driving the roll-up shaft is a physical device, such as a motor, mechanical structure, etc., if the drive member is a motor, the maximum rotate speed of the motor, i.e. the maximum drive rate, is constant, the speed of rotation of the roll-up shaft is also constant, and thus the stretching rate of the roll screen is also constant. Thus, in one example, the stretching rate can be obtained by experimenting or calculating in advance according to the type of the drive member. Taking the pre-calculated stretching rate as an example, the stretching rate is equal to the tangential rate of the roll-up shaft, which is equal to the product of the angular velocity of the driving member and the radius of the roll-up shaft. Then, the stretching rate can then be stored to a specified location, such as local memory, cloud, or cache. When there is a need to obtain size compensation, the processor can read the stretching rate from the specified location.

In step 12, the window of a current application displayed by the roll-up screen is resized based on the stretching rate and duration of the roll-up screen.

Figure 2:
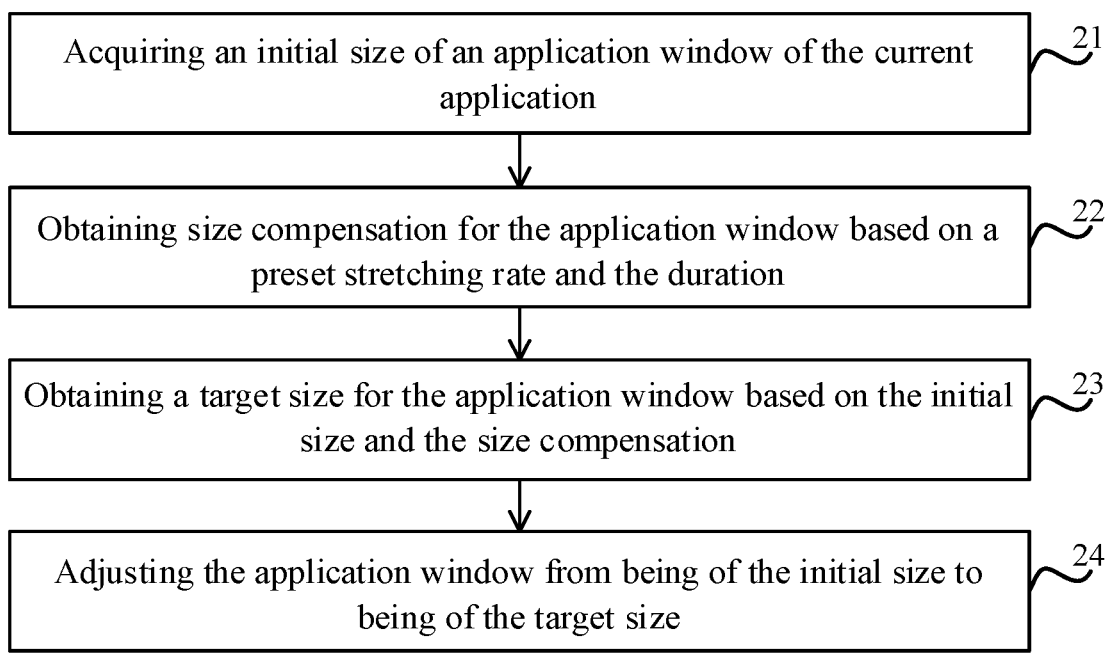
FIG. 2 is a flow chart of another method for resizing a window illustrated in accordance with an example of the present disclosure.

In this example, the processor in the electronic device can resize the window of the current application displayed by the roll-up screen based on the stretching rate and duration of the roll-up screen, as shown in FIG. 2, which includes steps 21 to 24.

In step 21, the processor in the electronic device may acquire an initial size of an application window of the current application.

In one example, the processor may query each displayed application window, and consider all application windows as application windows to be adjusted for the current application. In this case, the processor may acquire the initial size of each application window. It should be understood that the initial size can be acquired by calling the WindowManager- Service in the operating system; or it can be acquired by sending a size acquisition request to each current application, and the current application will return the initial size in response to the acquisition size request; or it can be acquired by storing the size of each application window at each moment to a specified location and reading the initial size directly from the specified location. The appropriate acquisition method can be selected according to the specific scenario, without limitation here. In this way, the initial sizes of all the displayed application windows in this example can be acquired to facilitate the subsequent adjustment of the size of the application window.

Figure 3:
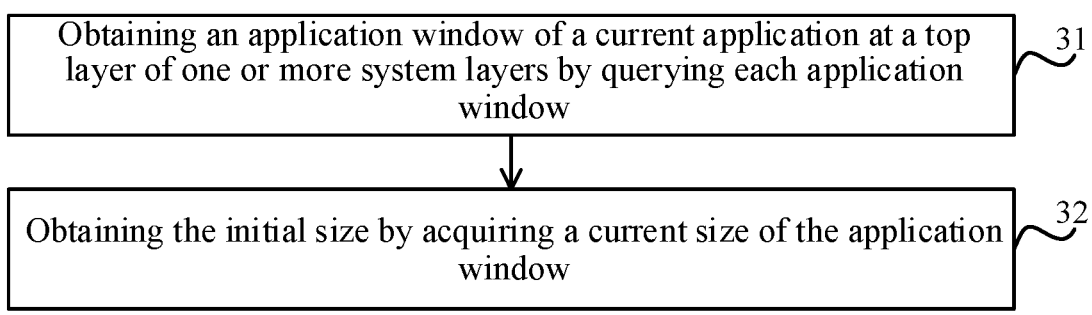
FIG. 3 is a flow chart of obtaining an initial size of an application window illustrated in accordance with an example of the present disclosure.

In another example, referring to FIG. 3, in step 31, the processor may obtain an application window of a current application at a top layer of one or more system layers by querying each application window; and in step 32, the processor may obtain the initial size by acquiring a current size of the application window. In this way, the initial size of the application window at the top layer can be acquired in this example, which can reduce the number of acquired initial sizes and reduce the time consumption. Moreover, it can also reduce the number of application windows for subsequent adjustments, further reducing the time consumption and helping to improve the use experience.

It should be noted that the example shown in FIG. 3 only illustrates the acquisition of the initial size of the application window at the top layer. In another example, the processor may also acquire the initial size of the system window of the operating system to adjust the initial size of the system window simultaneously when subsequently resizing the application window at the top layer, so as to ensure that the size of the system window matches the size of the roll-up screen and facilitate the user to use the services provided by the operating system and improve the use experience.

In step 22, the processor may obtain size compensation for the application window based on a preset stretching rate and the duration.

In this example, the processor of the electronic device may obtain the duration for which the control button is triggered, or the duration for which the roll-up screen is extended or retracted. For example, from the moment the control button is pressed, the processor can calculate the length of time from the current moment to the moment the timing starts, to obtain the duration.

It should be understood that, taking into account that the user touches the control button for a long time, if the timing has been from the moment when the control button was pressed, the duration may be longer, and eventually the roll-up screen is in a contracted or extended state and the application window does not change, i.e., the application window does not match the roll-up screen during the expansion and contraction of the roll-up screen.

For the above reason, the processor can resize the window according to a set period, i.e. the application window is resized once in the set period so that the size of the application window matches the size of the roll-up screen. In other words, the overflow size of the application window during the reduction of the size of the roll-up screen or the size of the application window that is smaller than the size of the roll-up screen during the increase of the size of the roll-up screen cannot be perceived by the user.

For example, within the first period, the start of the touch duration is the moment when the control button is pressed and the end of the touch duration is the moment when the control button is up, in which case the duration for which the roll-up screen is extended or retracted is less than the set period; or the end of the touch duration reaches the end moment of the (first) set period, in which case the duration for which the roll-up screen is extended or retracted is equal to the set period. If the control button continues to be pressed, within the second period, the start of the touch duration is the end moment of the first period, and the end of the touch duration is the moment when the control button is up, in which case the duration is less than the set period; or the end of the touch duration reaches the end moment of the (second) set period, in which case the duration is equal to the set period. And so on, the processor can obtain the duration eventually, that is, during the period after the button key is pressed, the application window is resized according to respective set periods, and when the duration reaches the set period, the application window is resized, in this case, except that the corresponding duration within the last set period is less than the set period, the previous durations each is equal to the set period.

Figure 4:
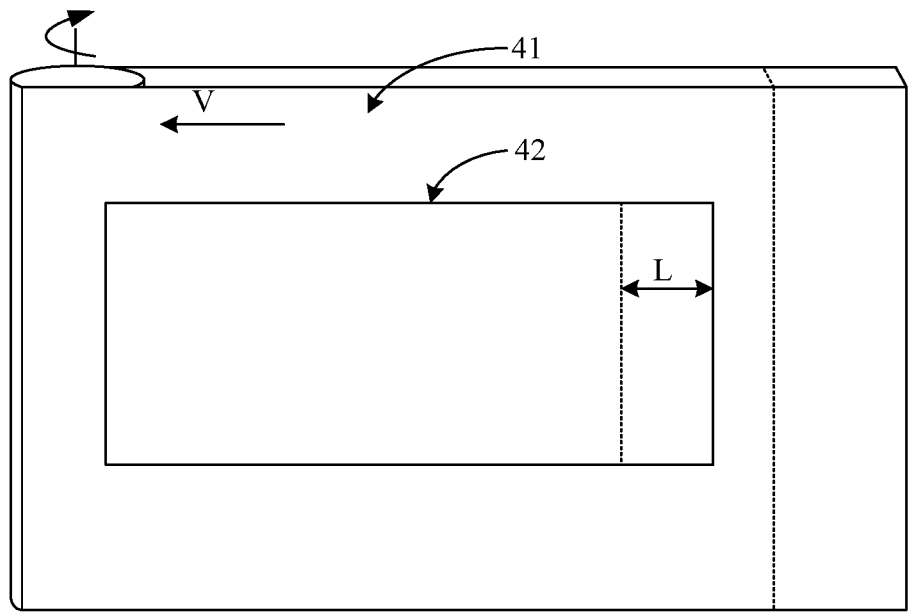
FIG. 4 is a schematic diagram of a size compensation amount illustrated in accordance with an example of the present disclosure.

In this example, the processor can calculate the product of the stretching rate and the duration, which is used to characterize the size compensation of the application window. Referring to FIG. 4, taking the contraction of the roll-up screen 41 as an example, the stretching rate is represented as V, and the duration is represented as T, the size compensation for the application window 42 is that $L=V*T$.

It should be noted that, taking into account that the adjustment is usually made to the size of one side of the roll-up screen, in the height direction, for example, the size compensation can characterize the size adjustment of the roll-up screen in the height direction. When the sizes of height and width of the roll-up screen are adjusted simultaneously, the processor can first obtain the size compensation in the height direction, and then, the processor can calculate the size compensation in the width direction based on the ratio value of height to width and the above size compensation in the height direction.

In step 23, the processor may obtain a target size for the application window based on the initial size and the size compensation.

In this step, the processor can obtain the target size of the application window based on the initial size and the size compensation. For example, the processor may calculate the difference between the initial size and the size compensation, where the difference is the target size of the application window. Taking the usual adjustment of the size of one side of the roll-up screen as an example, the target size is a value of the width or height of the roll-up screen minus the size compensation. When the roll-up screen is resized in height and width simultaneously, the processor can first obtain the above target size, which corresponds to the width (or height) direction, and then a target size corresponding to the height (or width) direction is calculated by the processor based on the ratio value of height to width and the above target size.

In step 24, the processor may adjust the application window from being of the initial size to being of the target size.

In this example, the processor can adjust the application window from being of the initial size to being of the target size. Further, the processor can store the target size to a specified location to update the initial size to the target size at the next period, i.e., the adjustment is made based on this target size in the next period.

Taking into account that the current application in the electronic device may be provided by a third party or may be a system built-in application, if the current application is provided by a third party, in the process of extending and retracting the roll-up screen, the processor sends the target size to the third-party application when it detects that the control-button is up, and the third-party application may receive the size data provided by the system service, at which point the application window will be adjusted by the third-party application directly to be of the target size. In view of above, it can be seen that the size of the application window may not be changed by the third-party application during the time period from the moment the button is trigged to the last moment of the trigger operation, but may only be adjusted at the moment when the button is up, i.e. the size of the application window is adjusted at the last moment of the operation trigged for rotating the roll-up shaft, thus causing the lagging phenomenon. In order to solve the above problem, the processor in this example can acquire an application type of the current application, such as a type of a system built-in application or a third-party application type. Therefore, the processor can adjust the application window from being of the initial size to being of the target size according to the application type.

In an example, when the application type of the current application is a type of the system built-in application, the processor can adjust the application window directly from being of the initial size to being of the target size, thus improving the adjustment efficiency.

Figure 5:
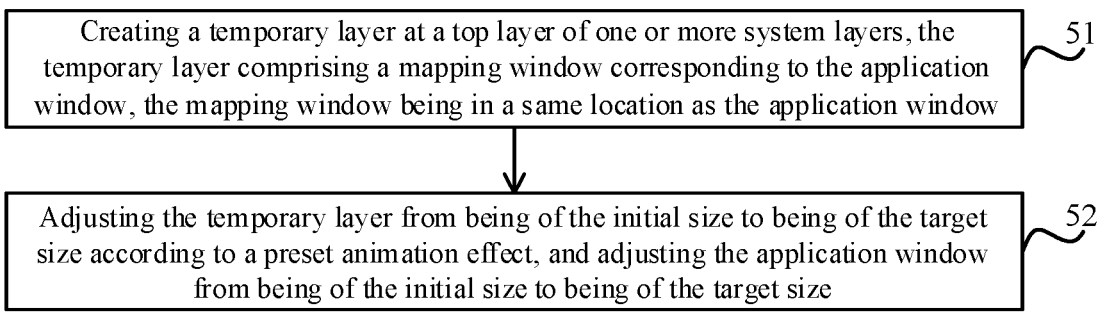
FIG. 5 is a flow chart of a method for resizing a window illustrated in accordance with an example of the present disclosure.

In another example, when the application type of the current application is a third-party application type, referring to FIG. 5, in step 51, the processor may create a temporary layer at a top layer of one or more system layers. This temporary layer may cover the display area of the roll-up screen, and the temporary layer includes a mapping window corresponding to the application window, which is in the same location as the application window. That is, from the direction of the electronic device towards the user, the mapping window of the temporary layer is the projection of the application window of the third-party application on the temporary layer; or from the direction of the user towards the electronic device, what the user sees is the mapping window of the temporary layer and the application window of the third-party application is covered by the mapping window.

Figure 6:
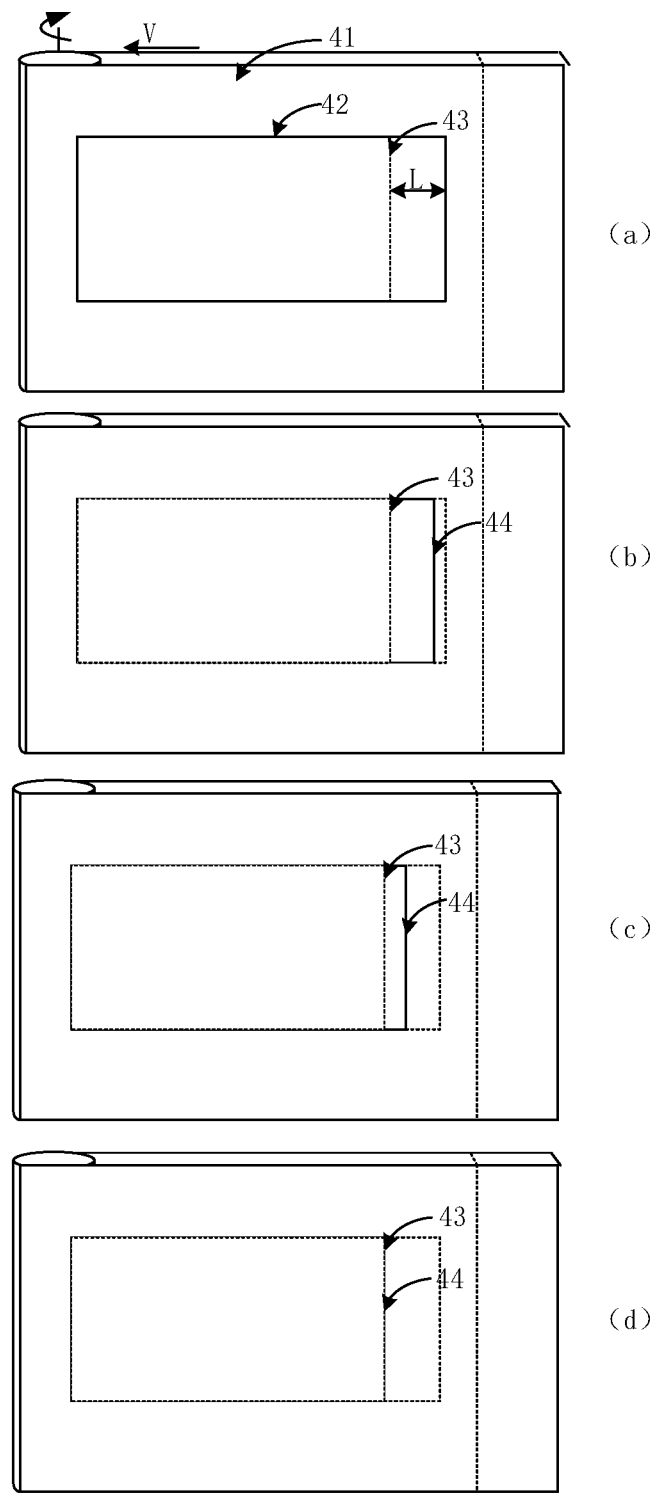
FIG. 6 is a schematic diagram of adjusting a temporary layer to resize an application window illustrated in accordance with an example of the present disclosure.

In step 52, the electronic device may adjust the temporary layer from being of the initial size to being of the target size according to a preset animation effect, and adjust the application window from being of the initial size to being of the target size. The preset animation effects may include, but are not limited to, effects such as extending and fading in, extending and fading out, etc. In other words, referring to FIG. 6, in the layer where the application window is located, the application window 42 will be adjusted from being of the initial size 43 to being of the target size directly in (a) of FIG. 6, while the temporary layers 44 in (b), (c) and (d) of FIG. 6 will be adjusted from being of the initial size 43 to being of the target size according to the preset animation effect. After the two actions are superimposed, the effect presented to the user becomes that the application window 42 is adjusted from being of the initial size 43 to being of the target size according to the preset animation effect, and the effect is shown in (d) of FIG. 6, thereby eliminating the lagging phenomenon.

In summary, in the solutions provided by the examples of the present disclosure, the stretching rate and duration of the roll-up screen can be obtained in response to the operation triggered for rotating the roll-up shaft being detected, and the window of the current application displayed by the roll-up screen can be resized based on the stretching rate and duration of the roll-up screen. In this way, by adjusting the initial size to the target size in the examples, the size of the application window can be matched with the size of the roll-up screen, which can avoid the lagging feeling caused by the application window overflowing the roll-up screen or the application window changing to be of the target size, conducive to improving the use experience.

Figure 7:
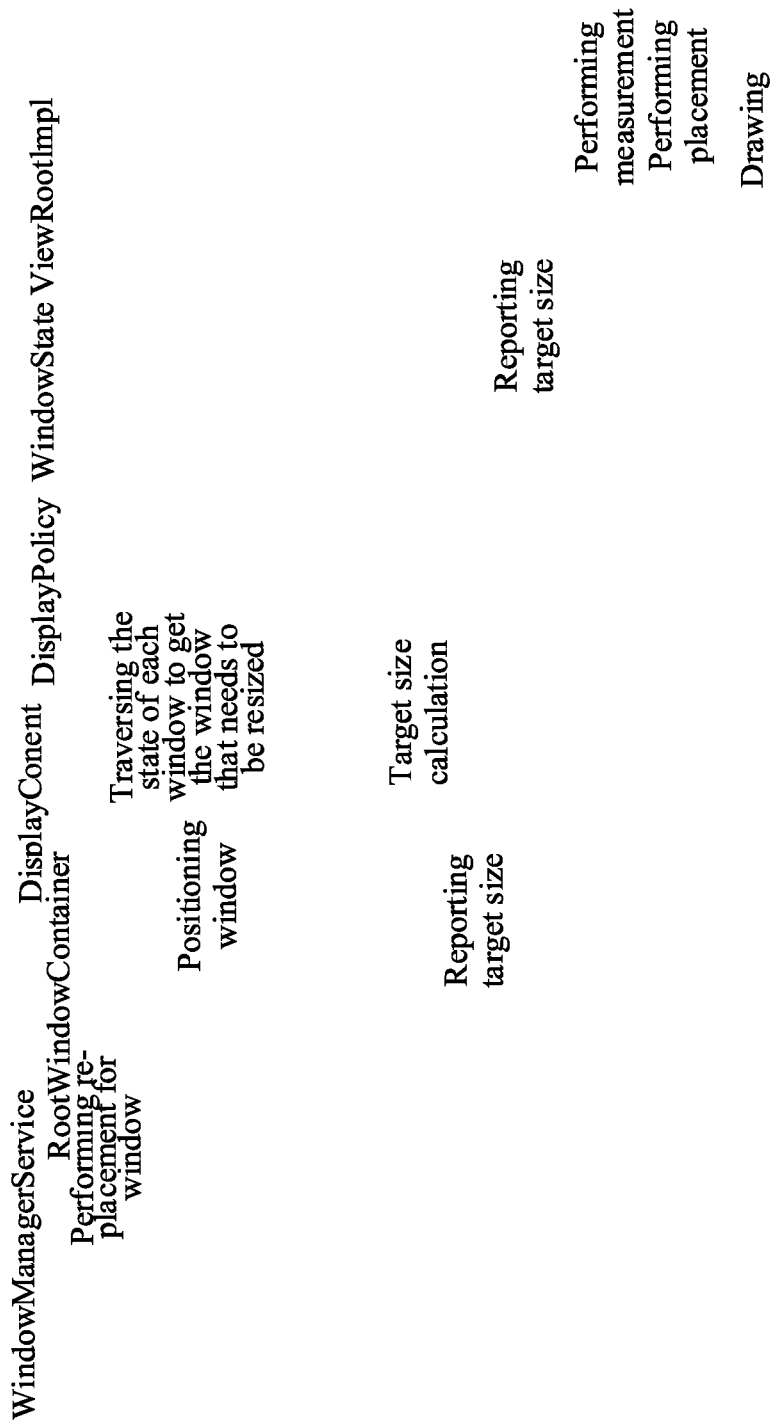
FIG. 7 is a schematic diagram of a method for resizing a window illustrated in accordance with an example of the present disclosure.

The process of the method for resizing the window is described below in relation to a specific scenario, referring to FIG. 7, including as follows.

The size of the application window can be changed in real time during the extension and retraction process of the roll-up screen. When the roll-up screen starts to change, a signal is sent from the bottom layer of the system to WindowManagerService (hereinafter referred to as WMS), which recalculates the size of the window and notifies the application layer to re-measure, place and draw it, so that the application window changes while the content also changes in real time, thus ensuring a smooth and silky display of the application window.

For example, when the user touches a control button, the WindowManagerService (WMS) of the system service of the electronic device detects the need to perform replacement for the window, and the WMS can send a request to RootWindowContainer to call the RootWindowContainer service. The RootWindowContainer service can locate each currently displayed application window, call the DisplayContent service to traverse each application window and obtain the window that needs to be replaced, and call the DisplayPolicy service, which calculates the target size of each window.

Taking into account that it will take longer if all application windows are refreshed in the process of refreshing application window, only the system window and the application window at the top layer can be matched in this example, while the other application windows are not refreshed, thus reducing the refresh time.

The RootWindowContainer service can report to the WindouState service after obtaining the target size, and the WindouState service reports it to theViewRootlmpl service in the application layer. The ViewRootlmpl service will measure, place and draw the application window according to the target size, and finally the application window will be redisplayed in the roll-up screen, i.e., resized from being of the initial size to being of the target size.

In this example, the electronic device includes the system built-in application. In this case, the system application can resize the application window according to the above method, so that the size of the application window matches the size of the roll-up screen. For the third-party application, this example may adopt the following scheme: adding, by the bottom layer, a layer (i.e., the temporary layer) to the top layer of one or more system layer, similar to a screenshot of the current display area; then, performing the animation effect of extending and fading out on this temporary layer during the change of the roll-up screen, which can shield the lagging phenomenon that occurs when the application window is refreshed, making the whole process more smooth and natural.

Figure 8:
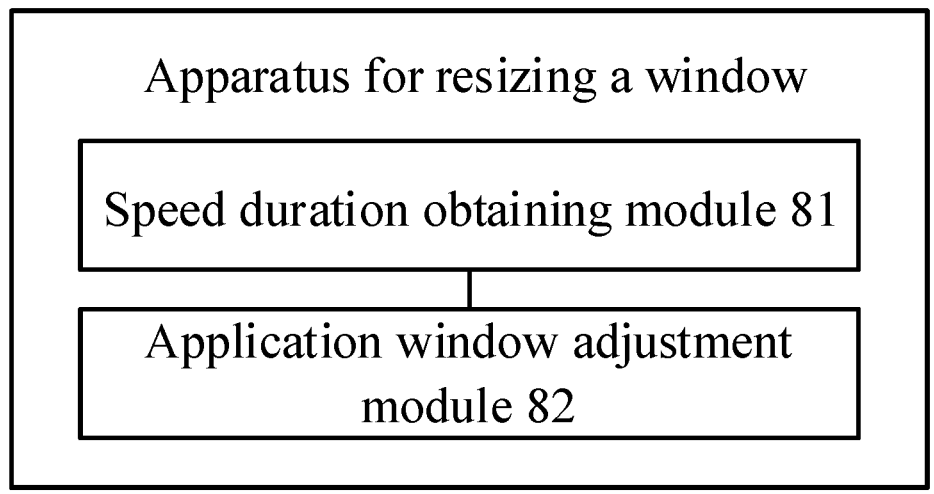
FIG. 8 is a block diagram of an apparatus for resizing a window illustrated in accordance with an example of the present disclosure.

On the basis of the method for resizing the window provided in examples of the present disclosure, the examples of the present disclosure further provide an apparatus for resizing the window, applied to an electronic device provided with a roll-up screen, referring to FIG. 8, the apparatus including: a speed duration obtaining module 81 configured to obtain, in response to an operation triggered for rotating a roll-up shaft being detected, a stretching rate and duration of the roll-up screen; and an application window adjustment module 82 configured to resize the window of a current application displayed by the roll-up screen based on the stretching rate and duration of the roll-up screen.

Optionally, the application window adjustment module 82 includes: an initial size acquisition sub-module configured to acquire an initial size of an application window of the current application; a compensation obtaining sub-module configured to obtain size compensation for the application window based on a preset stretching rate and the duration; a target size obtaining sub-module configured to obtain a target size for the application window based on the initial size and the size compensation; and an application window adjustment sub-module configured to adjust the application window from being of the initial size to being of the target size.

Optionally, the initial size acquisition sub-module includes: an application window obtaining unit configured to obtain an application window of a current application at a top layer of one or more system layers by querying each application window; and an initial size obtaining unit configured to obtain the initial size by acquiring a current size of the application window.

Optionally, the application window adjustment sub-module includes: an application type acquisition unit configured to acquire an application type of the current application; and an application window adjustment unit configured to adjust the application window from being of the initial size to being of the target size according to the application type.

Optionally, when the application type is a third-party application type, the application window adjustment unit includes a temporary layer creation sub-unit configured to create a temporary layer at a top layer of one or more system layers, the temporary layer comprising a mapping window corresponding to the application window, the mapping window being in a same location as the application window; and an application window adjustment sub-unit configured to adjust the temporary layer from being of the initial size to being of the target size according to a preset animation effect, and adjust the application window from being of the initial size to being of the target size.

Optionally, when the application type is a type of a system built-in application, the application window adjustment unit includes an application window adjustment sub-unit configured to adjust the application window directly from being of the initial size to being of the target size.

It should be noted that the apparatus illustrated in the examples matches the contents of the method examples, which can be referred to the above method examples and will not be repeated here.

Figure 9:
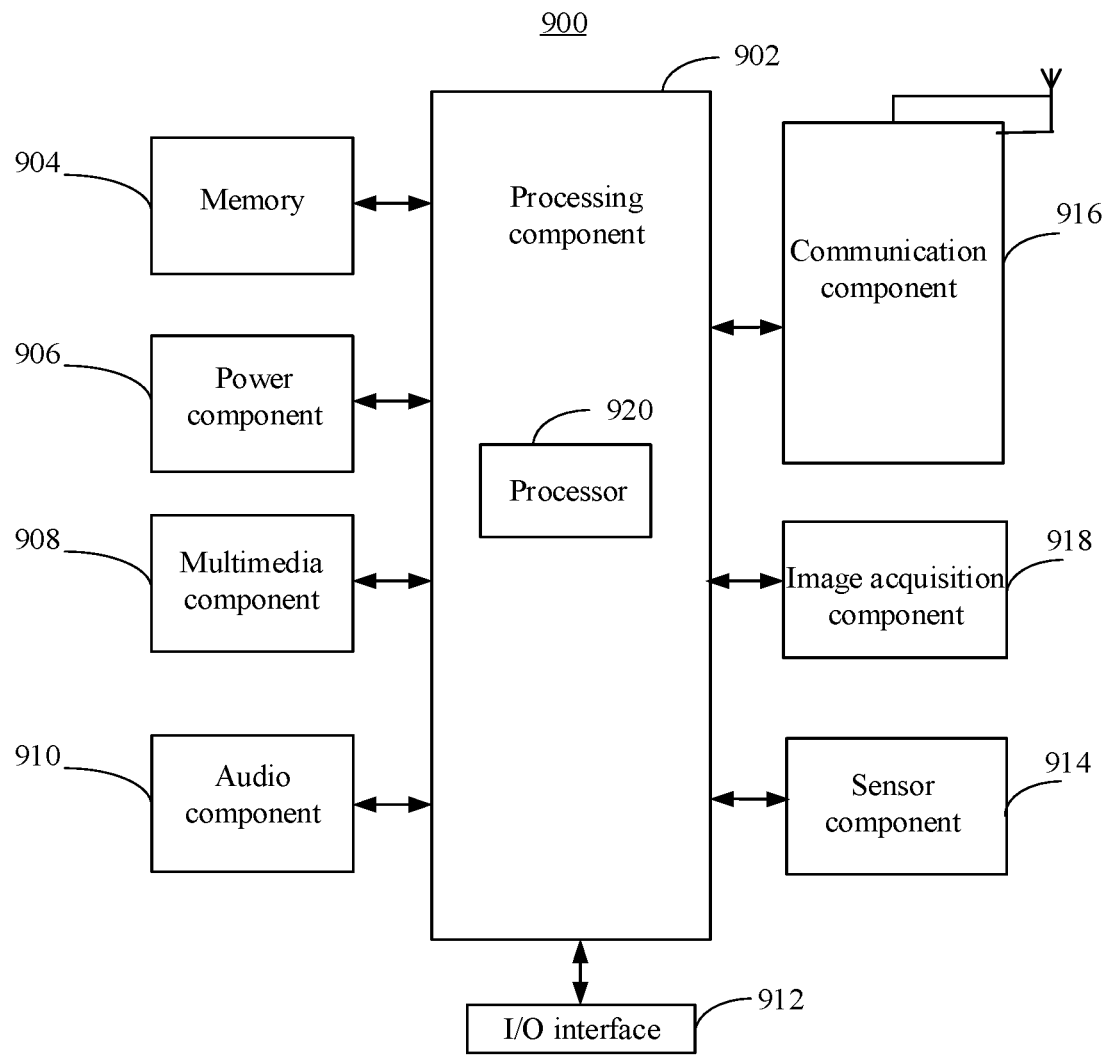
FIG. 9 is a block diagram of an electronic device illustrated in accordance with an example of the present disclosure.

FIG. 9 is a block diagram of an electronic device illustrated in accordance with an example. For example, the device 900 may be a mobile phone, a computer, a digital broadcast terminal, a tablet device, a medical device, a fitness device, a personal digital assistant, and the like.

Referring to FIG. 9, the device 900 may include one or more of the following components: a processing component 902, a memory 904, a power component 906, a multimedia component 908, an audio component 910, an input/output (I/O) interface 912, a sensor component 914, a communication component 916, and an image acquisition component 918.

The processing component 902 typically controls the overall operation of the device 900, such as operations associated with display, phone call, data communication, camera operation, and recording operations. The processing component 902 may include one or more processors 920 to execute the computer programs. In addition, the processing component 902 may include one or more modules that facilitate interaction between processing component 902 and other components. For example, processing component 902 may include a multimedia module to facilitate interaction between multimedia component 908 and processing component 902.

The memory 904 is configured to store various types of data to support operation at the electronic device 900. Examples of such data include the computer programs for any application or method of operation on the device 900, contact data, phonebook data, messages, images, videos, etc. The memory 904 can be implemented by any type of transitory or non-transitory storage device or a combination of them, such as static random-access memory (SRAM), electrically erasable programmable read-only memory (EE-PROM), erasable programmable read-only memory (EPROM), programmable read-only memory (PROM), read-only memory (ROM), magnetic memory, flash memory, disk, or CD.

The power component 906 provides power to the various components of the device 900. The power component 906 may include a power management system, one or more power supplies, and other components associated with generating, managing, and distributing power for the device 900. The power component 906 can include a power supply chip, and the controller can communicate with the power chip, so as to control the power supply chip on or off the switching device, so that the battery supplies power to the main board circuit power or not.

The multimedia component 908 includes a screen providing an output interface between the device 900 and the user. In some examples, the screen may include a liquid crystal display (LCD) and a touch panel (TP). If the screen includes a touch panel, the screen may be implemented as a touch screen to receive input information from a target object. The touch panel includes one or more touch sensors to sense touches, swipes, and gestures on the touch panel. The touch sensors may not only sense the boundaries of the touch or swipe action, but also detect the duration and pressure associated with the touch or swipe action.

The audio component 910 is configured to output and/or input audio file information. For example, the audio component 910 includes a microphone (MIC) configured to receive external audio file information when the device 900 is in an operating mode, such as call mode, recording mode, and voice recognition mode. The received audio file information may be further stored in memory 904 or sent via communication component 916. In some examples, the audio component 910 further includes a speaker for outputting audio file information.

The I/O interface 912 provides an interface between the processing component 902 and a peripheral interface module. The peripheral interface module may be a keyboard, click wheel, button, etc.

The sensor component 914 includes one or more sensors for providing status assessment of various aspects of the device 900. For example, the sensor component 914 may detect an open/closed state of the device 900, the relative positioning of components, such as the components being the display and keypad of the device 900, the sensor component 914 may also detect a change in position of the device 900 or a component of the device 900, the presence or absence of the target object contact with the device 900, the orientation or acceleration/deceleration of the device 900 and temperature changes of the device 900. In this example, the sensor component 914 may include a magnetic sensor, a gyroscope, and a magnetic field sensor, where the magnetic field sensor includes at least one of the following: a Hall sensor, a thin film magneto-resistive sensor, and a magnetic liquid acceleration sensor.

The communication component 916 is configured to facilitate communication between the device 900 and other devices by wired or wireless means. The device 900 may access a wireless network based on any communication standard, such as WiFi, 2G, 3G, 4G, 5G, or a combination thereof. In one example, the communication component 916 receives broadcast information or broadcast-related information from an external broadcast management system via a broadcast channel. In an example, the communication component 916 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth® (BT) technology, and other technologies.

In examples, the electronic device 900 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components.

In examples, there is also provided a non-transitory computer readable storage medium, such as a memory including instructions. The executable computer program can be executed by a processor. The readable storage medium may be ROM, random access memory (RAM), CD-ROM, magnetic tape, floppy disk, and optical data storage devices, among others.

Other examples of the present disclosure will readily occur to those skilled in the art upon consideration of the specification and practice of the disclosure disclosed herein. The present disclosure is intended to cover any variations, uses, or adaptations of the present disclosure that follow the general principles of the present disclosure and include common knowledge or techniques in the technical field not disclosed by the present disclosure. The specification and examples are to be regarded as exemplary only, and the true scope and spirit of the disclosure being indicated by the following claims.

It should be understood that the present disclosure is not limited to the precise structures described above and illustrated in the accompanying drawings, and that various modifications and changes may be made without departing from the scope thereof. The scope of the present disclosure is limited only by the scope of the appended claims.

What is claimed is:

1. A method for resizing a window, comprising:
   obtaining, by an electronic device with a roll-up screen, a stretching rate and duration of the roll-up screen in response to detecting an operation triggered for rotating a roll-up shaft; and
   resizing an application window of a current application displayed on the roll-up screen based on the stretching rate and the duration of the roll-up screen, by
   acquiring an initial size of the application window of the current application;
   obtaining size compensation for the application window based on the stretching rate and the duration, wherein the stretching rate is preset;
   obtaining a target size for the application window based on the initial size and the size compensation;
   acquiring an application type of the current application; and
   adjusting the application window from being of the initial size to being of the target size according to the application type,
   wherein when the application type is a third-party application type, adjusting the application window from being of the initial size to being of the target size according to the application type, comprises:
   creating a temporary layer at a top layer of one or more system layers, the temporary layer comprising a mapping window corresponding to the application window, the mapping window being in a same location as the application window; and
   adjusting the temporary layer from being of the initial size to being of the target size according to a preset animation effect, and adjusting the application window from being of the initial size to being of the target size.

2. The method of claim 1, wherein acquiring the initial size of the application window of the current application, comprises:
   obtaining the application window of the current application at a top layer of one or more system layers by querying each application window; and
   obtaining the initial size by acquiring a current size of the application window.

3. The method of claim 1, wherein when the application type is a type of a system built-in application, adjusting the application window from being of the initial size to being of the target size according to the application type, comprises:
   adjusting the application window directly from being of the initial size to being of the target size.

4. An electronic device comprising:
   a roll-up screen, a memory, and a processor, wherein the memory is configured to store a computer program executable by the processor; and
   the processor is configured to:
   obtain, in response to an operation triggered for rotating a roll-up shaft being detected, a stretching rate and duration of the roll-up screen; and
   resize an application window of a current application displayed on the roll-up screen based on the stretching rate and the duration of the roll-up screen, by
   acquiring an initial size of the application window of the current application;
   obtaining size compensation for the application window based on the stretching rate and the duration, wherein the stretching rate is preset
   obtaining a target size for the application window based on the initial size and the size compensation; and
   adjusting the application window from being of the initial size to being of the target size;
   wherein when the application type is a third-party application type, the processor is further configured to:
   create a temporary layer at a top layer of one or more system layers, the temporary layer comprising a mapping window corresponding to the application window, the mapping window being in a same location as the application window; and
   adjust the temporary layer from being of the initial size to being of the target size according to a preset animation effect, and adjusting the application window from being of the initial size to being of the target size.

5. The electronic device of claim 4, wherein the processor is further configured to:

obtain the application window of the current application at a top layer of one or more system layers by querying each application window; and obtain the initial size by acquiring a current size of the application window.

6. The electronic device of claim 4, wherein when the application type is a type of a system built-in application, the processor is further configured to:

adjust the application window directly from being of the initial size to being of the target size.

7. A non-transitory computer-readable storage medium that, when an executable computer program therein is executed by a processor of an electronic device provided with a roll-up screen, implements the method comprising:

obtaining, in response to an operation triggered for rotating a roll-up shaft being detected, a stretching rate and duration of the roll-up screen; and resizing an application window of a current application displayed on the roll-up screen based on the stretching rate and the duration of the roll-up screen by acquiring an initial size of the application window of the current application;

obtaining size compensation for the application window based on the stretching rate and the duration, wherein the stretching rate is preset obtaining a target size for the application window based on the initial size and the size compensation; and adjusting the application window from being of the initial size to being of the target size;

wherein when the application type is a third-party application type, adjusting the application window from being of the initial size to being of the target size according to the application type, comprises:

creating a temporary layer at a top layer of one or more system layers, the temporary layer comprising a mapping window corresponding to the application window, the mapping window being in a same location as the application window; and adjusting the temporary layer from being of the initial size to being of the target size according to a preset animation effect, and adjusting the application window from being of the initial size to being of the target size.

8. The storage medium of claim 7, wherein acquiring the initial size of the application window of the current application, comprises:

obtaining the application window of the current application at a top layer of one or more system layers by querying each application window; and obtaining the initial size by acquiring a current size of the application window.

9. The storage medium of claim 7, wherein when the application type is a type of a system built-in application, adjusting the application window from being of the initial size to being of the target size according to the application type, comprises:

adjusting the application window directly from being of the initial size to being of the target size.

\* \* \* \* \*